United States Patent [19]
Rebel

[11] Patent Number: 5,445,070
[45] Date of Patent: Aug. 29, 1995

[54] FOOD PROCESSOR

[75] Inventor: Joachim Rebel, Reichenbach/Fils, Germany

[73] Assignee: Maweva Holding, AG, Switzerland

[21] Appl. No.: 996,081

[22] Filed: Dec. 23, 1992

[30] Foreign Application Priority Data

Jan. 1, 1992 [EP] European Pat. Off. ......... 91121410

[51] Int. Cl.⁶ ............................................. B26D 1/00
[52] U.S. Cl. ..................... 99/511; 366/246; 366/331; 366/347
[58] Field of Search ............... 366/199, 244, 205, 242, 366/246, 252, 281, 283, 288, 293, 294, 314, 331, 142, 347; 99/511, 492, 503; 241/37.5, 36, 101.1, 101.2, 92, 282.1, 282.2

[56] References Cited

U.S. PATENT DOCUMENTS

| | | | |
|---|---|---|---|
| 2,896,924 | 7/1959 | Jepson | 366/205 |
| 3,135,500 | 6/1964 | Perrinjaquet | 241/282.1 |
| 4,285,473 | 8/1981 | Williams | 366/314 |
| 4,297,038 | 10/1981 | Falkenbach | 366/314 |
| 4,410,280 | 10/1983 | Yamauchi et al. | 366/205 |
| 4,572,445 | 2/1986 | Cristante | 241/37.5 |
| 4,700,903 | 10/1987 | Henn | 241/101.2 |
| 4,744,522 | 5/1988 | Borgmann et al. | 241/101.1 |
| 4,799,626 | 1/1989 | Hickel et al. | 241/37.5 |
| 4,921,174 | 5/1990 | Okada et al. | 366/314 |
| 5,129,589 | 7/1992 | Papaleo et al. | 241/37.5 |

FOREIGN PATENT DOCUMENTS

| | | | |
|---|---|---|---|
| 0022465 | 5/1980 | European Pat. Off. | |
| 0177748 | 4/1986 | European Pat. Off. | 366/347 |
| 3837961 | 11/1988 | Germany | |

Primary Examiner—David A. Scherbel
Assistant Examiner—James F. Hook
Attorney, Agent, or Firm—Wigman, Cohen, Leitner & Myers

[57] ABSTRACT

A food processor especially a home food processor, which includes a bottom part on the housing on which can be mounted a work holder carrying a work device. A cover for the process which can be rotated into a locked position, includes a detachable connection between it and the housing. A drive device having an electric motor arranged in a separate housing can be positioned to form a detachable connection with gearing provided in the bottom part of the housing. A controllable safety device is provided so that by means of the cover of the work holder and the gearing, actuation occurs only when the cover is placed on the work holder and is found in its locked rotary setting.

13 Claims, 5 Drawing Sheets

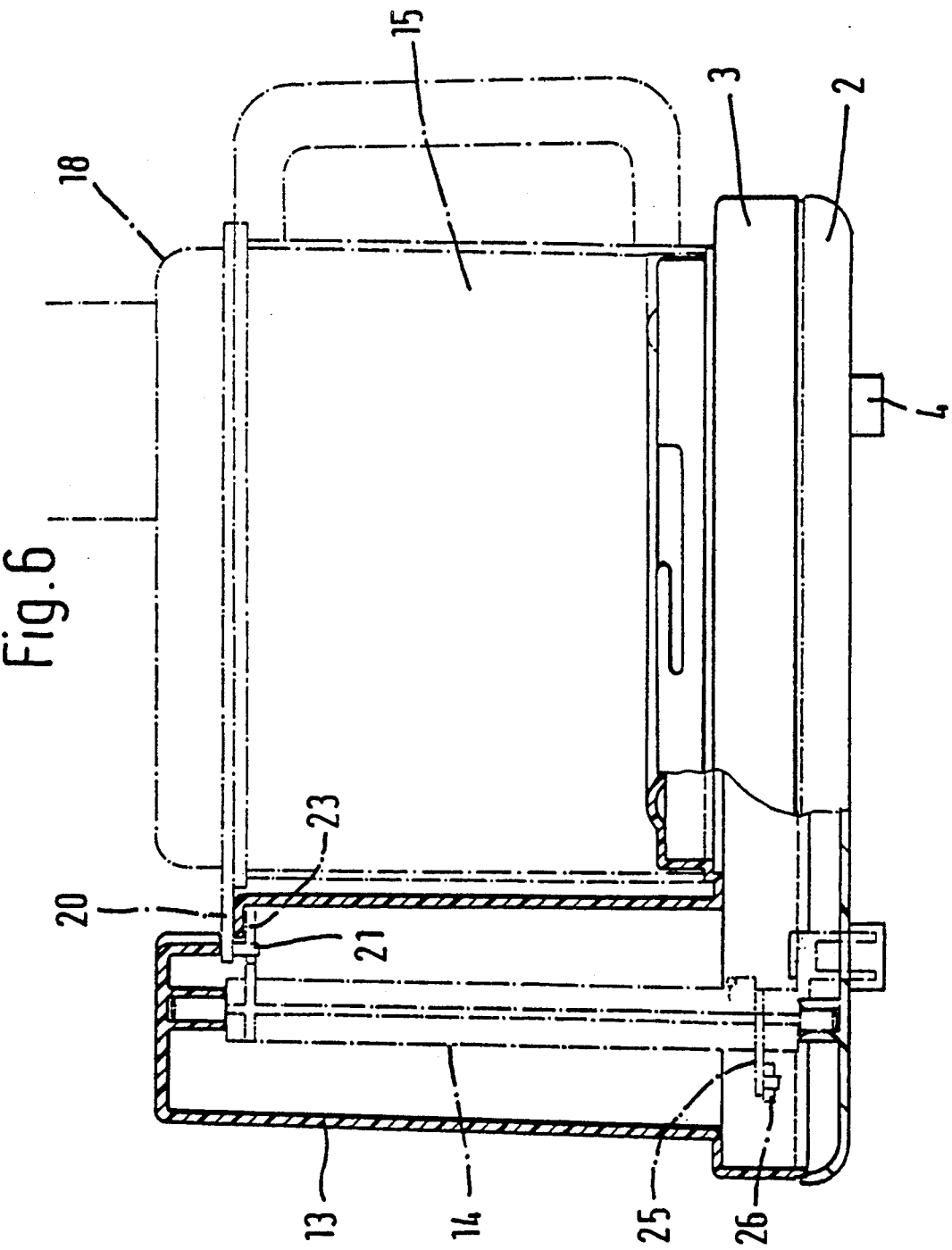

FOOD PROCESSOR

BACKGROUND OF THE INVENTION

The invention relates to a food processor, especially a food processor for use in the home which has unique safety features.

Traditional food processors include a drive motor, associated gearing and a drive shaft for receiving a work device or a plurality of interchangeable work devices. These work devices generally include a structural unit arranged in one common housing which is coupled to the drive shaft. The cost for a food processor of this type is relatively high, depending on whether a safety switch is present, which permits connecting the drive motor only when the cover is placed on the work holder. As a result, the cover of the work holder can be removed directly following disconnection of the safety switch.

Therefore, during discharge of the motor following current interruption by the safety switch, a user can reach into the work area of the work device.

Furthermore a food processor of the aforementioned type is already known in which a so-called rod mixer, in the form of a separate kitchen device, provides the drive. Since a conventional rod mixer is already present in most homes, the cost for such a food processor is considerably lower than the cost of a food processor with a built-in or integrated drive motor. When a rod mixer is purchased separately, the relation between the cost on the one hand and the range of possible uses on the other hand is more favorable than in conventional integrated food processors, because the rod mixer can also be used independently of the food processor.

In conventional food processors of the above type, no safety measure is provided to prevent the user from reaching into the work area while the machine is running. Also, it is not possible to provide a safety switch of the above type because the rod mixer forms an entity unto itself independent of the food processor.

OBJECTS AND SUMMARY OF THE INVENTION

An important object of the present invention is to provide a food processor of the aforementioned type which overcomes the disadvantages of conventional food processors and provides a high standard of safety for the user. Another object of the invention is to provide an economical food processor which provides extensive protection thereby permitting the user to safely reach into the work area of the work device.

In one preferred embodiment, a form-locking protection member intended to protect the cover against torsion force is provided by the drive device through the locking device when in its locked position. Thus, the cover cannot be removed from the work holder before the electric motor of the transmission has been uncoupled. The drive motor must therefore be disconnected and uncoupled before the work holder can be opened by removal of the cover. Then it is reliably guaranteed with simple means that the user can reach into the tools when they are in the motor discharge phase.

The locking device is controlled by the cover of the work holder and allows a connection between the electric motor and the gearing only when the cover is placed on the work holder and is found in its locked position. Thus, only when the work holder has been closed can the tools be placed in motion.

When a conventional rod mixer is provided as the drive device, the housing of the bottom part of the food processor is then preferably provided with pass-through openings or slots for the rod-like elements of the protective cap of the rod mixer, which can be securely closed by means of the locking device. Then, by using simple, but effective means, the rod mixer is prevented from being coupled with the gearing of the food processor before the cover of the work holder has come into its locked position.

Furthermore, a holder for the drive device can be provided on the cover, which holds the drive device in the locked position of the cover only in that position in which its drive shaft has the required alignment and orientation on this shaft for a coupling with the shaft of the transmission gearing. Such a holder likewise prevents placing the food processor in operation before the cover has been brought into its locked rotary position, in which the operator cannot reach into the work container.

For added safety, the main circuit of the drive device can be in the form of a monostable switch which is opened in its stable state. The drive motor is then automatically disconnected as soon as the operator releases the drive device. Such a switch is also advantageous in that the user, who must hold the drive device tightly in hand during use of the food processor, can then also secure the food processor against wandering on the mounting surface as a result of vibrations.

Since various different work devices, for instance a cutter or chopper, or a centrifuge, have quite different optimum rotary speeds and considerably different torque requirements, with one preferred embodiment of the food processor according to the invention the gearing incorporates a second work shaft in addition to the first work shaft, arranged coaxially with the first, and the two work shafts have different rotary speeds for their work and also different diameters. Also the drive device can be switched to at least two different work speeds, and thus four different rotary speeds are available for the work devices.

The shaft required in this case for transmission of the rotary movement of an actuating member cooperating with a carrier member on the cover is mounted rotatably in a hollow column or cylinder in one preferred embodiment. The cylinder is constructed on the bottom part of the housing at a predetermined distance from the work shaft and also at a predetermined distance from the gear shaft to be coupled with the drive device.

With reference to the space required for the work device or devices, the hollow column and the drive device, a base outline of the bottom part of the food processor is generally in the shape of the letter "D". That is, the base defines a continuous curve composed of a semicircle to which are connected two straight lines or walls running parallel to one another and one straight line or wall perpendicular to the latter and connected to them by quarter circles of which the radius is considerably smaller than that of the semicircle, and that in the two corner areas limited partially by the quarter circles are provided the circular plate and the circular cylindrical column designed to connect the drive device with the gearing.

BRIEF DESCRIPTION OF THE DRAWINGS

The invention is to be described in detail hereinafter relative to one exemplary embodiment shown in the drawing wherein:

FIG. 6 is a representation of the area of the column in cross section, and an uncut representational view of the exemplary embodiment with work device placed thereon;

DETAILED DESCRIPTION OF THE PREFERRED EMBODIMENTS

Figure 1:
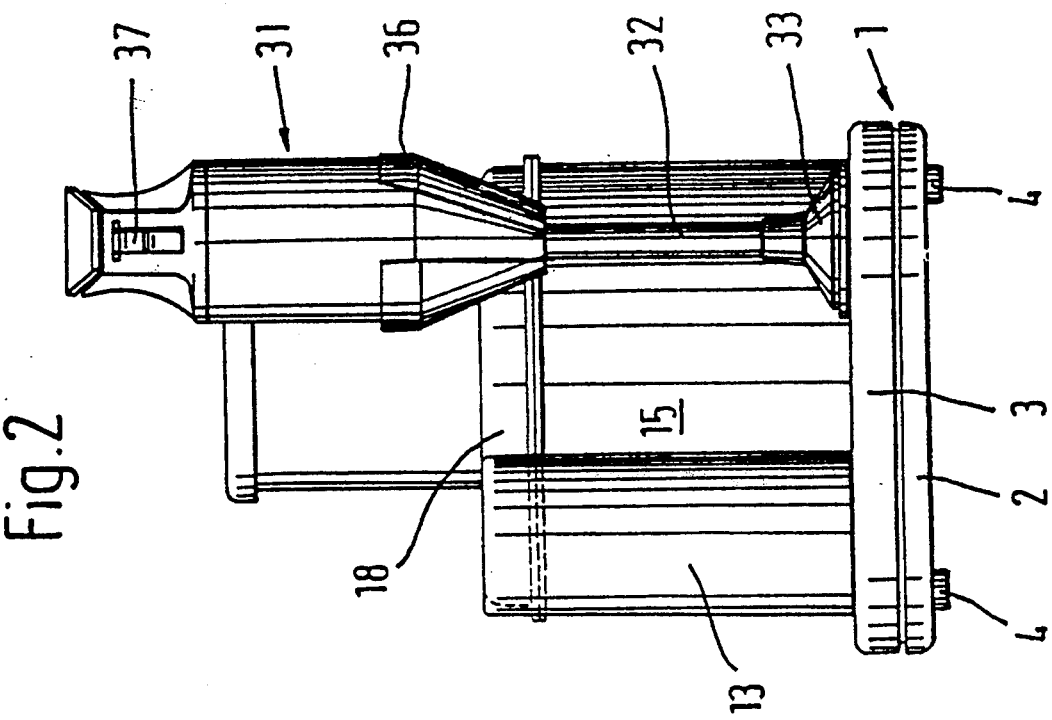
FIG. 1 is a side elevational view of an exemplary embodiment of the present invention in combination with one work device.
Figure 2:
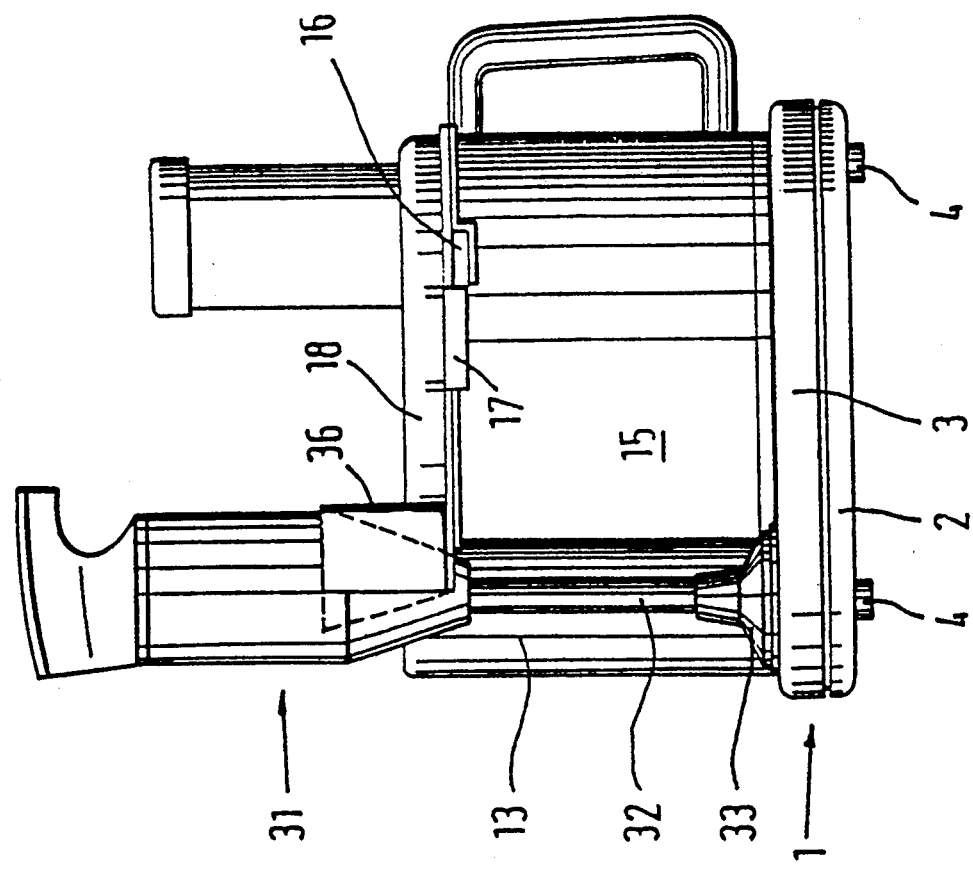
FIG. 2 is a front elevational view of the exemplary embodiment of FIG. 1.
Figure 4:
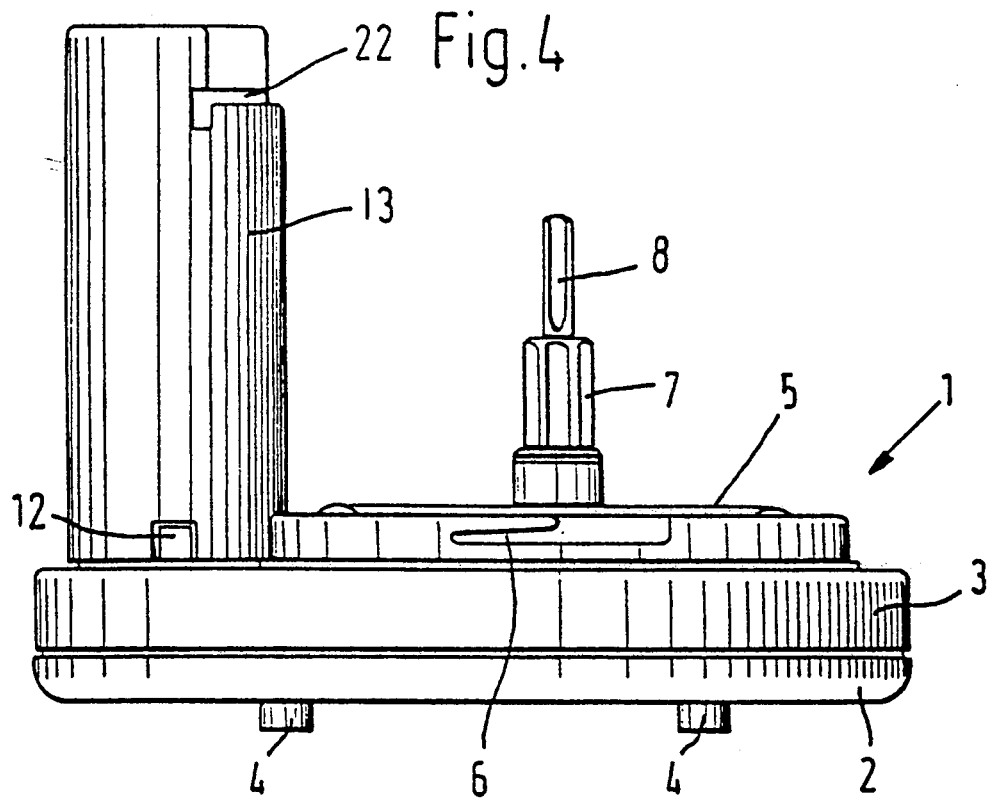
FIG. 4 is a side elevational view of the exemplary embodiment of FIG. 1, but without the drive device and work device.

Referring now to the drawings wherein like numerals indicate like parts throughout the several views there is shown in FIGS. 1 and 2 an exemplary embodiment of the food processor according to the invention which has a bottom part indicated in its entirety with reference numeral 1. Bottom 1 has a plastic housing of a saucer-like lower portion 2 and an upper portion 3 resting thereon. Feet 4 project from lower portion 2. As shown particularly in FIGS. 4 and 5, housing top part 3 forms a somewhat raised, essentially circular mounting surface 5 for receiving the work holder of a work device or a plurality of work devices. To hold the work holder itself securely in the work position, the circular cylindrical wall area which supports mounting surface 5 is provided with diametrically arranged bayonet closing V-notches 6, with which projecting members of the work holder are in engagement when the work holder is in work position.

Two coaxially configured work shafts 7, 8 project out of housing upper portion 3 from the center of mounting surface 5. The longitudinal axes of the shafts 7, 8 are perpendicular to mounting surface 5 and coaxial with respect to each other. The shaft 8 has the smaller diameter and projects from the free end of hollow, larger diameter work shaft 7. Accordingly, the work speed of shaft 8 is greater than that of work shaft 7.

Figure 7:
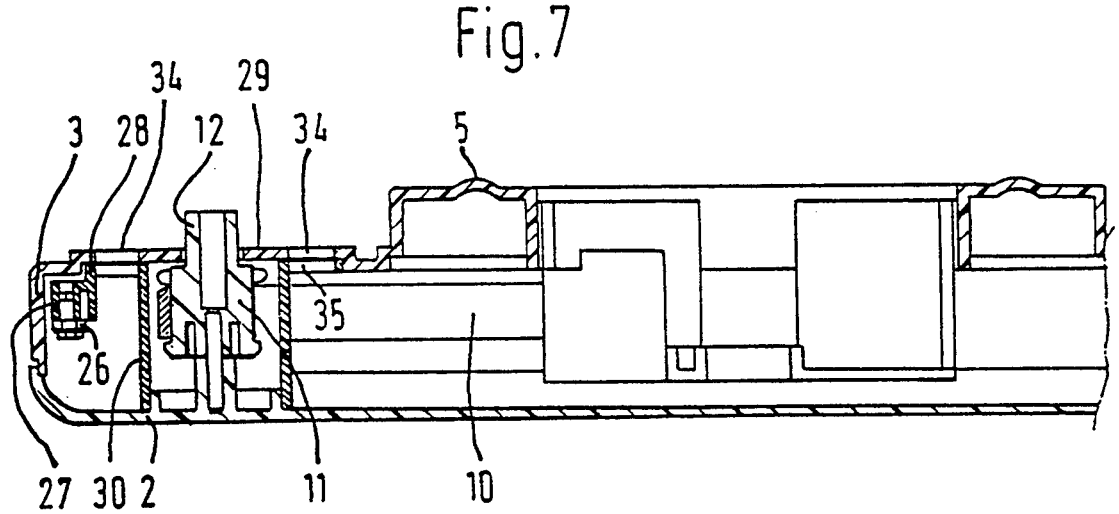
FIG. 7 is a partial representation of a longitudinal section through the drive shaft of the gearing of the exemplary embodiment with the locking device in release position.
Figure 8:
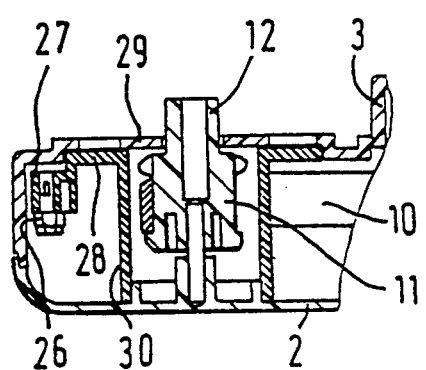
FIG. 8 is a section similar to FIG. 7 with the locking device in locked position.
Figure 5:
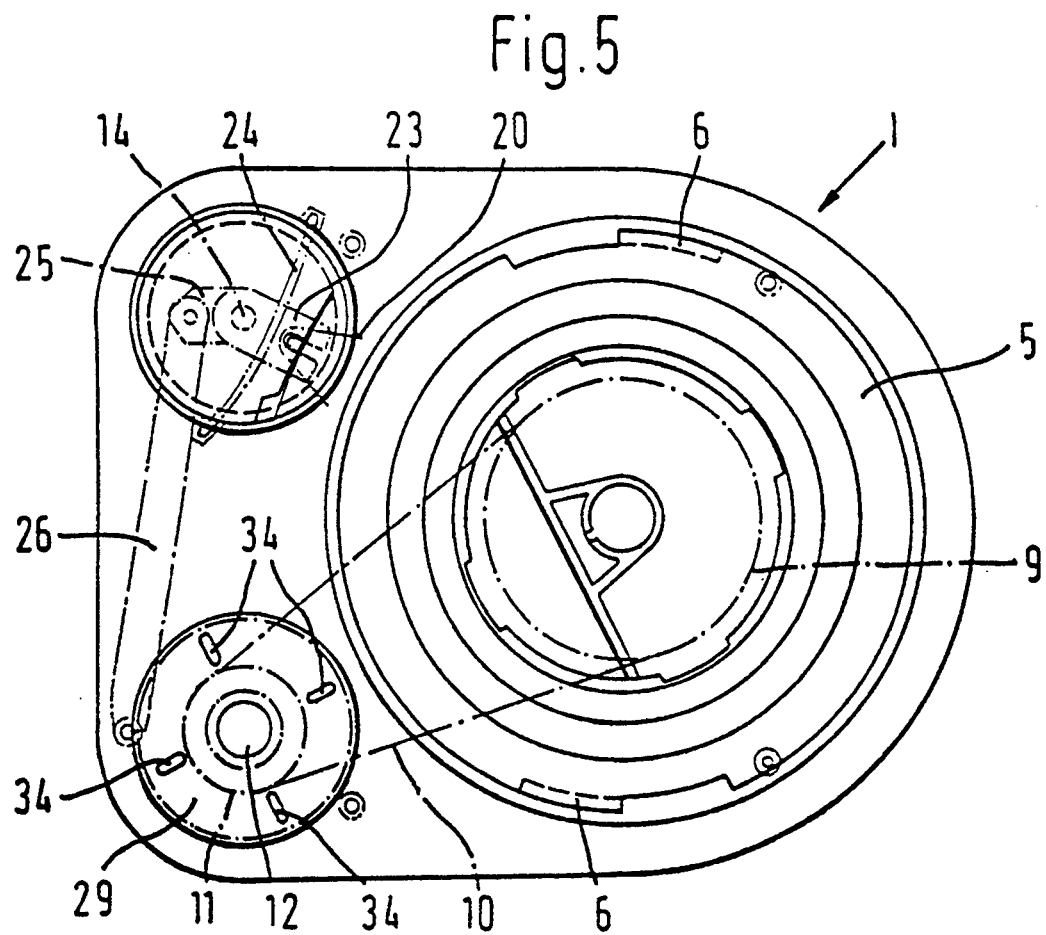
FIG. 5 is a plan view of the exemplary embodiment of FIG. 4 with the work device and drive device removed.

Work shafts 7 and 8 are driven by a common gearing, configured in a known manner, which is arranged in bottom part 1 of the food processor. As seen in FIG. 5, pulley 9 is driven by a toothed belt 10 engaging pulley 11, which is somewhat smaller in diameter. Pulley 11 is rotatably mounted, having its axis parallel to the axis of pulley 9 and work shafts 7, 8, and perpendicular to bottom part 1, whereby the axial spacing is greater than the radius of mounting surface 5. As is shown in FIGS. 7 and 8, pulley 11 has a hollow collar or hub 12 which projects beyond the top surface of upper portion 3, and in this area which projects upwardly, there is provided with a transverse slot (not shown).

Figure 3:
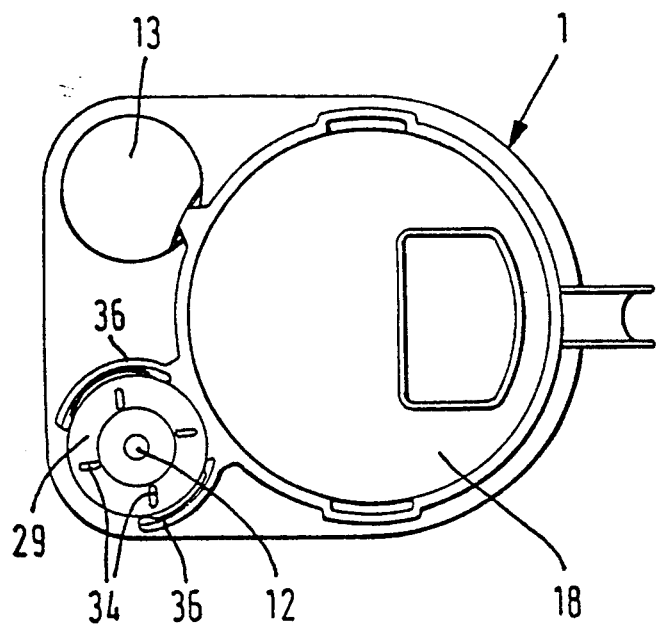
FIG. 3 is a plan view of the exemplary embodiment of FIG. 1.

As shown in FIGS. 3, 5 the overall shape of housing bottom part 1 is defined by a continuous curve formed of part of a semicircle, two lines or walls running parallel to one another connecting to it, and a straight line or wall running at a right angle to the latter is formed, this line or wall being connected to the two parallel lines or walls by two quarter circles with considerably smaller radius than that of the semicircle. The semicircle has a somewhat larger radius than that of mounting surface 5, and driving collar 12 is situated in one of the corner sections defined and limited by the quarter circles but at some distance from the quarter circles.

A hollow cylinder 13 extends upwardly from the top of upper portion 3, at a suitable distance from the other quarter circle. Cylinder 13 is shaped to fit with portion 3. Between the outside cover surface and the cylindrical area of portion 3 supporting mounting surface 5, an intermediate space is present for the bottom edge zone of the work holder overlapping the cylindrical area.

As shown in FIG. 6, a vertical operating plastic shaft 14 is positioned within a closed cylinder 13. Shaft 14 has an upper end which is mounted rotatably in the top end of cylinder 13. The bottom end of shaft 14 is mounted rotatably in housing bottom portion 2. Shaft 14 is operatively associated with a locking device, which guarantees that the work holder of a work device mounted on bottom part 1 is closed by the associated cover while the moving or rotating parts of the work device are in motion.

The work holder 15, resting on mounting surface 5, is connectable with bottom part 1 through its bayonet closing grooves 6. Thus the work holder of a cutting, grating, friction or centrifuge instrument can be utilized according to the invention via bayonet closing grooves 16 in the area of its top edge, arranged at strategic diametrically opposite positions relative to one another, with which bayonet closing elements 17 of an associated cover can be brought into engagement. For this purpose, the cover is placed on work holder 15 and is rotated until bayonet closing elements 17 engage at the end of bayonet closing grooves 16.

Figure 9:
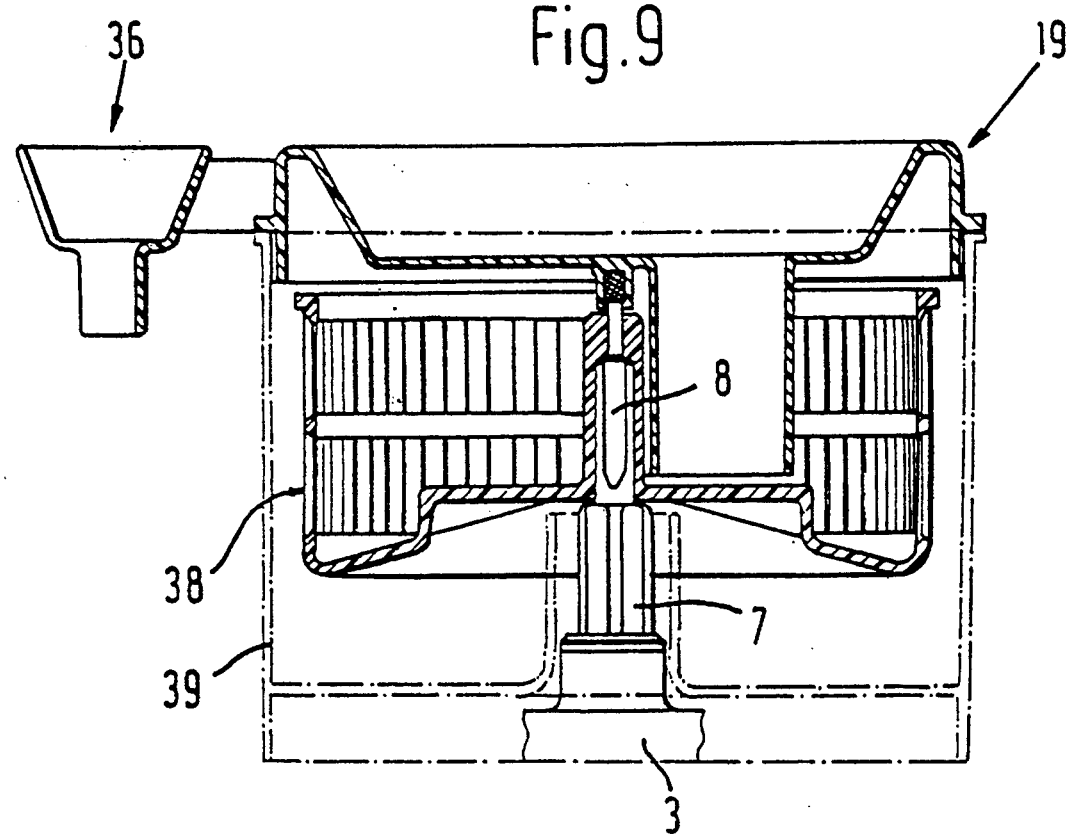
FIG. 9 is a section through the cover and the part of a centrifuge coupled with the work shaft.
Figure 10:
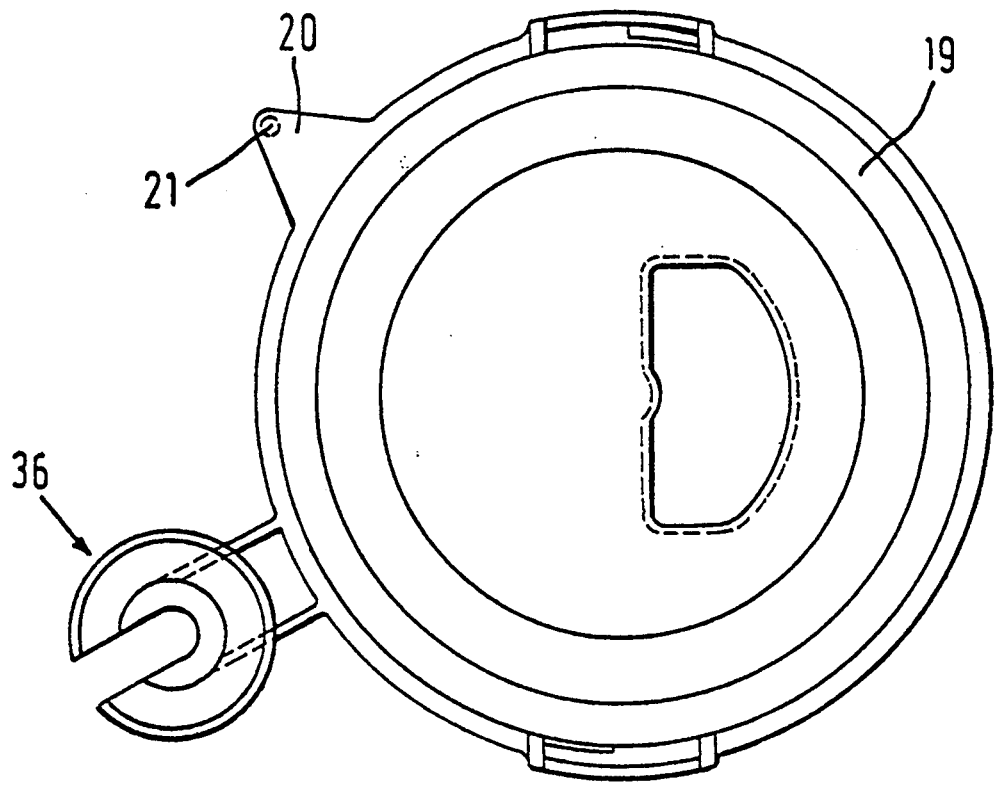
FIG. 10 is a plan view of the cover of the centrifuge.

In FIG. 6, the cover 18 of a cutting, grating and friction tool is illustrated in dashed lines whereas in FIGS. 9, 10 the cover 19 of a centrifugal juice maker is shown. A radially projecting tongue 20 (FIGS. 6, 10) is fitted to the edge of the respective cover. A carrier pin 21 projects perpendicularly downward from covers 18, 19 in the area of the free end. Cylinder 13, which extends upward as far as the top of the cover, is provided with a slot 22 (FIG. 4) through which tongue 20 and carrier pin 21 can be introduced. Also, in the exemplary embodiment, cylinder 13 is provided with a flat recessed head surface on the side turned toward the cover above the level of the cover, which is limited at the bottom by a wall, on which tongue 20 finds a mounting.

FIGS. 5 and 6 show that a fork-like actuating member 23 projects from operating shaft 14, and is nonrotatably connected with operating shaft 14. As shown in FIG. 5, when the cover is rotated counterclockwise following its placement on the work holder, carrier pin 21 enters the slot of activating member 23 even before the cover has reached its end position in which bayonet closing grooves 16 and bayonet closing elements 17 lock together and hold the cover. Thus, activation member 23 is carried along by carrier pin 21 and brought into the pivotal position shown in FIG. 5, which it takes at the end of the rotary movement of the cover. Both in this end position as well as in the end position in which rotation of the cover is in clockwise direction, as shown in FIG. 5, carrier pin 21 is released from activating member 23, and activating member 23 is secured, fitted tightly by means of a prestressed leaf spring 24 having ends attached to the wall of cylinder 13. In this way, it is certain that the rotary position of operating shaft 14 always corresponds to the rotary position of the cover and cannot be modified without introduction of carrier pin 21.

Referring now to FIG. 5, the area of the bottom end of operating shaft 14, a pivot arm 25 is connected with this operating shaft, projecting radially therefrom, to which is articulated the one end of a connecting lever 26. The other end of lever 26 is connected to connecting part 27 with axis parallel to operating shaft 14. Part 27 is fitted tightly to the outside edge of a disk 28 and a locking body.

As shown in FIGS. 7, 8, disk 28 lies directly beneath an annular area 29 of the top limiting wall of housing top part 3 concentrically surrounding hub 12. Disk 28 is fitted tightly to the top end of a hollow cylindrical driving collar 30, is mounted rotatably in bottom part 1 and is provided with two slot areas (not shown), opening downward, into which penetrates toothed belt 10. As a result of the connection of the locking body consisting of annular disk 28 and hollow cylindrical driving collar 30 by means of a gear with levers with activation member 23, the rotary position of the locking body always corresponds to that of activation member 23.

As shown in FIGS. 1 and 2, the exemplary embodiment, the drive device actuating the food processor is a mixer 31 having a conical segment which extends from an upper circular cylindrical housing. A hollow rod 32 projects downwardly therefrom and includes at its lower and part or free end a cap 33. Four rod-like elements project from the cap 33 in parallel arrangement relative to the longitudinal axis of rod 32 to engage slots 34 provided in housing 3.

Within hollow rod 32 there is positioned a drive shaft, which projects considerably less distance than the rod-like elements over cap 33 and in the projecting end segment supports a transverse pin which must be brought into engagement with the transverse slot of hub 12 of belt pulley 11. To make this connection between the drive shaft of mixer 31 and the belt pulley 11, the rod-like elements projecting from cap 33 must be introduced into bottom part 1. The annular area 29 is therefore provided in an arrangement corresponding to the arrangements of the rod-like elements provided with slots 34, as shown in FIGS. 3, 4, 7, and 8. The outside diameter of annular area 29, which is somewhat raised, is selected so that it can be overlapped with the very slightest movement of cap 33, whereupon this provides additional safety against radial thrust.

As shown in FIG. 7, disk 28 of the locking body is provided with pass-through openings or slots 35, in an arrangement corresponding to the arrangement of pass-through openings or slots 34, so that, in that rotary position which corresponds to disk 28 being in locked position, as shown in FIG. 3, slots 34 are opened for passage of the rod-like elements. In that rotary position of the cover in which this cover can be removed from the work holder or must be placed thereon, disk 28 on the other hand closes off slots 34, as shown in FIG. 8.

This means that in this rotary position the shaft of mixer 31 cannot be coupled with hub 12 of pulley 11.

Disk 28 also ensures that the cover of the work device cannot be removed from the work holder, so long as the shaft of mixer 31 is coupled with hub 12 of the pulley 11. Indeed, disk 28 cannot be rotated as long as the rod-shaped projections from cap 33 of mixer 31 penetrate slots 35. Thus, activation member 23 is mechanically secured against pivotal movement, because pivotal movement of tongue 20 of the cover, as is required for release of the cover, cannot be executed. This is possible only after mixer 32 has been separated from bottom part 1.

Thus, when mixer 31 is not coupled with the machine, the slots 34 in the area 29 are closed by disk 28. As disk 28 is coupled to activation member 23 by the gear including parts 26, 25 and 14, activation member 23 is in its "unclosed" position.

Before mixer 31 can be brought in its working position, i.e., the position, in which its protrusions at the lower side of cap 33 penetrate slots 34 and slots 35 in disk 28, it is necessary to close container 15 with cover 18 or 19. During this rotation of the cover in a counter-clockwise direction, pin 21 enters the slot in member 23 and rotates member 23 in a clockwise direction (FIG. 5). This rotation causes shaft 14 and lever 25 to rotate and move lever 26, which in turn, rotates disk 28. By rotation of disk 28, slots 35 are brought in alignment with slots 34 thereby permitting mixer 31 to enter holder device 36 and be lowered until the protrusions of cap 33 penetrate slots 34 and 35 and the drive shaft of drive means 31, which is rotatably borne in tube 32 is coupled with hub 12. This coupling is realized by means of a transverse slot in hub 12 open to the upper end of the hub, and a cross-pin at the lower end of said drive shaft.

As seen in FIG. 2, an additional security feature preventing a user from reaching into the moving parts of a work device, is provided by holder 36 formed on the cover of the work device for mixer 31. Holder 36 has a cone, or bowl-like, conical shape in the exemplary embodiment with a radial slot for the passage of rod 32 of mixer 31. After rod 32 has been introduced through this slot into holder 36, mixer 31 must be lowered against bottom part 1, in order to bring the conical end segment of its housing into engagement on the corresponding conical inside surface of holder 36. Holder 36 however, is not aligned along the annular area provided with slots 34 and hub 12 of pulley 11 until the cover is found in its locked position. As a result, then, the cover must be brought into this position before mixer 31 can be inserted into holder 36, which can then couple its shaft with belt pulley 11. Likewise, holder 36 prevents rotary movement of the cover out of the locked position, as long as mixer 31 is still coupled with belt pulley 11.

Another safety feature provides the use of a main switch 37 for mixer 31 configured as monostable switch. This feature contributes to a very high security standard, because this type of switch compels the user, during use of the food processor, to tightly hold mixer 31 in hand. If released, the power is cut-off automatically.

While the tools of a cutting, stirring or kneading operation are coupled with work shaft 7 running at lower work speed, as shown in FIG. 9, the centrifuge part 38, for instance of a centrifugal juice maker, is coupled with work shaft 7 having the higher work speed. The work speed of work shaft 7 and that of work shaft 8 can both be modified in that the work speed of rod mixer 31 can be changed by a switch which is not shown.

As shown in FIGS. 9 and 10, the cover 19 on housing 39 carrying centrifuge part 38 is also provided with a tongue 20 and a holder 36.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A food processor for use with a removable drive device, said drive device having an electric motor and a rod extending coaxially with a drive shaft driven by said motor to be operatively engaged with the food processor, said rod and drive shaft being detachably connected with said food processor, comprising:
    a food processor housing having a bottom part;
    a gearing arranged in said bottom part to be operatively engaged with said rod and drive shaft;
    a work holder for holding a work device on said bottom part, said work device being drivingly engaged with said gearing;
    a cover removably affixed to said work holder and rotatable relative to said work holder into a locked position;
    a safety locking device actuatable by said cover, said safety locking device enabling the connection between said electric motor and said gearing only when said cover is placed on the work holder in its locked position, said safety locking device including a movably mounted locking member connected with a movably mounted actuating member, said actuating member being connected with said cover when said cover is in its locked position, said locking member being held in a locked position by said lower end of said drive device when said lower end part is connected with said bottom part and said gearing, said actuating member being held in a locked position by said locking member when said locking member is locked by said lower end part to prevent rotation of said cover out of its locked position;
    wherein said bottom part of said food processor housing includes means for coupling said drive shaft to said gearing, and a recess provided in said bottom part for receiving a distal end of said rod; and
    wherein said recess is toggled between an open position for receiving said rod when said actuating member is in the locked position, and a closed safety position.

2. Food processor as in claim 1, further including a holder device provided on said cover for said drive device, such that when the cover is in the locked position the drive device is held in a position by a drive shaft aligned for coupling with said gearing on the shaft of said gearing which is to be driven.

3. Food processor as in claim 2, wherein said holder device for said rod mixer has a cone-like shape and includes an opening through which of said mixer extends, said holder device including a radial slot for the entry of said rod.

4. Food processor as in claim 1, wherein said gearing includes a plurality of work shafts having different diameters in coaxial alignment to operate at different work speeds.

5. Food processor as in claim 4, wherein a selected work shaft having a smaller diameter portion rotates at a higher work speed relative to the work speed of a work shaft having a larger diameter portion, said smaller diameter portion extending beyond the free end of the larger shaft portion.

6. Food processor as in claim 2, wherein said bottom part of said housing includes a hollow cylinder, said cylinder including said actuating member of said safety locking device.

7. Food processor as in claim 6, wherein said cover includes a control element comprising a carrier pin, which cooperates with said actuation member, said actuation member including a vertical operating shaft for engaging said carrier pin.

8. Food processor as in claim 7, further including said locking member in said bottom portion of said housing in rotary connection with said operating shaft via said gearing, whereby only in the rotary position of said actuation member corresponding to the locked position of said cover are said drive device and gearing engaged.

9. Food processor as in claim 2, wherein said locking member includes a hollow cylindrical part mounted rotatably concentric to said shaft of said gearing, and a plurality of openings are provided in said bottom housing part to allow selective engagement of said drive shaft of said drive device with said gearing and said housing.

10. Food processor as in claim 1, wherein said drive device has a switch for selection of one of two different work speeds.

11. Food processor as in claim 1, wherein said drive device has a monostable main switch which automatically returns to an off position when said switch is released.

12. Food processor as in claim 1, wherein said work device is a fragmentation device selected from a group of stirring, kneading and juicing devices.

13. Food processor as in claim 1, wherein a horizontal cross-section taken at a vertical height of said bottom part of the housing defines a plurality of housing walls including a substantially semicircular periphery having a radius connected to two parallel straight walls and one straight wall perpendicular to and connected with said parallel walls by quarter circles having radii which are substantially smaller than the radius of the semicircular periphery, and two corner areas limited partially by said quarter circles include a circular plate and a circular column for operatively engaging said drive device with said gearing.

* * * * *